United States Patent
Schenk

(10) Patent No.: US 10,173,268 B2
(45) Date of Patent: Jan. 8, 2019

(54) DRILL CHUCK

(71) Applicant: Roehm GmbH, Sontheim/Brenz (DE)

(72) Inventor: Peter Schenk, Niederstotzingen (DE)

(73) Assignee: Roehm GmbH, Sontheim/Brenz (DE)

( * ) Notice: Subject to any disclaimer, the term of this patent is extended or adjusted under 35 U.S.C. 154(b) by 0 days.

(21) Appl. No.: 14/640,760

(22) Filed: Mar. 6, 2015

(65) Prior Publication Data

US 2015/0251252 A1    Sep. 10, 2015

(30) Foreign Application Priority Data

Mar. 6, 2014    (DE) .................. 10 2014 002 969

(51) Int. Cl.
  *B23B 31/12* (2006.01)
  *B21H 7/14* (2006.01)
  *B23B 27/24* (2006.01)

(52) U.S. Cl.
  CPC .......... *B23B 31/1238* (2013.01); *B21H 7/14* (2013.01); *B23B 27/24* (2013.01); *B23B 2226/61* (2013.01); *B23B 2231/28* (2013.01); *B23B 2231/40* (2013.01); *B23B 2260/09* (2013.01);
(Continued)

(58) Field of Classification Search
  CPC .............. B23B 31/001; B23B 31/1238; B23B 2231/28; B23B 2231/40; B23B 2260/09; Y10T 279/32; Y10T 279/17623; Y10T 279/17632; Y10S 279/902
  See application file for complete search history.

(56) References Cited

U.S. PATENT DOCUMENTS

| | | | |
|---|---|---|---|
| 896,051 A * | 8/1908 | Ashley | B23B 31/1238 279/62 |
| 2,381,113 A * | 8/1945 | Cook | F16B 19/1054 411/53 |

(Continued)

FOREIGN PATENT DOCUMENTS

| CN | 1200689 A | 12/1998 |
|---|---|---|
| CN | 2421112 Y | 2/2001 |

(Continued)

OTHER PUBLICATIONS

Liu Bing et al., "Erfahrungen zur Herstellung von Raendeln mit einer Drehmaschine," "Lathe Knurling Experience" Technical Data for Mechanical Workers, Aug. 31, 1975, p. 16.

(Continued)

*Primary Examiner* — Eric A Gates
*Assistant Examiner* — Chwen-Wei Su
(74) *Attorney, Agent, or Firm* — Muncy, Geissler, Olds & Lowe, P.C.

(57) ABSTRACT

A drill chuck having a chuck body, having a clamping sleeve with a conical basic shape that can rotate about the chuck axis of the chuck body, by the rotation of which clamping sleeve a plurality of clamping jaws can be moved relative to the clamping body. The clamping sleeve is made in two parts, having a conical, metallic outer sleeve, having a conical, inner sleeve made of plastic, wherein the outer sleeve has a cylindrical subsection on its inner circumference for radial centering of the outer sleeve on the inner sleeve. A clamping sleeve and a method for producing knurling on the clamping sleeve are also provided.

15 Claims, 6 Drawing Sheets

(52) U.S. Cl.
CPC .... *Y10S 279/902* (2013.01); *Y10T 279/17632* (2015.01); *Y10T 279/32* (2015.01)

(56) References Cited

U.S. PATENT DOCUMENTS

| | | | | |
|---|---|---|---|---|
| 4,097,054 A * | 6/1978 | Derbyshire | ........... | B23B 31/102 |
| | | | | 279/60 |
| 4,275,893 A | 6/1981 | Bilanceri | | |
| 5,435,578 A | 7/1995 | Röhm | | |
| 5,503,409 A | 4/1996 | Röhm | | |
| 5,580,197 A * | 12/1996 | Rohm | .................. | B23B 31/001 |
| | | | | 279/157 |
| 5,765,839 A | 6/1998 | Röhm | | |
| 5,829,761 A | 11/1998 | Roehm | | |
| 5,988,653 A * | 11/1999 | Kuo | ...................... | B23B 31/123 |
| | | | | 279/140 |
| 7,000,926 B1 * | 2/2006 | Wenhua | .............. | B23B 31/1238 |
| | | | | 279/62 |
| 9,174,281 B2 | 11/2015 | Schenk | | |
| 9,649,697 B2 | 5/2017 | Schenk | | |
| 2003/0067123 A1 * | 4/2003 | Mack | .................. | B23B 31/001 |
| | | | | 279/62 |
| 2004/0135325 A1 * | 7/2004 | Cachod | ................ | B23B 31/123 |
| | | | | 279/62 |
| 2006/0202435 A1 * | 9/2006 | Rohm | ................ | B23B 31/1238 |
| | | | | 279/62 |
| 2006/0279048 A1 | 12/2006 | Gong et al. | | |
| 2007/0052182 A1 * | 3/2007 | Bordeianu | ............ | B23B 31/123 |
| | | | | 279/62 |
| 2008/0156057 A1 | 7/2008 | Lin et al. | | |
| 2012/0007322 A1 * | 1/2012 | Sakamaki | ............. | B23B 31/123 |
| | | | | 279/61 |
| 2012/0274035 A1 * | 11/2012 | Schenk | ............... | B23B 31/1238 |
| | | | | 279/60 |
| 2013/0161044 A1 * | 6/2013 | Hecht | ................. | B23B 31/1238 |
| | | | | 173/90 |

FOREIGN PATENT DOCUMENTS

| | | | | |
|---|---|---|---|---|
| CN | 101212876 A | 7/2008 | | |
| CN | 101574766 A | 11/2009 | | |
| DE | 19782147 B4 * | 9/2007 | ......... | B23B 31/1238 |
| EP | 0 785 041 A1 | 7/1997 | | |
| JP | S5246586 A | 4/1977 | | |
| JP | H071212 | 1/1995 | | |
| JP | H07214407 A | 8/1995 | | |
| JP | H08281505 A | 10/1996 | | |
| JP | 2012232407 A | 11/2012 | | |

OTHER PUBLICATIONS

Sun Qi et al., "Research on the Craft of Knurling", Aeronautical Technology, Jun. 30, 1993, pp. 33-35.

* cited by examiner

DRILL CHUCK

This nonprovisional application claims priority under 35 U.S.C. § 119(a) to German Patent Application No. 10 2014 002 969.7, which was filed in Germany on Mar. 6, 2014, and which is herein incorporated by reference.

BACKGROUND OF THE INVENTION

Field of the Invention

The present invention relates to a drill chuck having a chuck body, having a clamping sleeve with a conical basic shape that can rotate about the chuck axis of the chuck body, by the rotation of which clamping sleeve a plurality of clamping jaws can be moved relative to the clamping body.

Description of the Background Art

Drill chucks of this type are widely known in the prior art, with the clamping sleeve always being made of plastic. Furthermore, steel clamping sleeves with a cylindrical lateral surface are known from the prior art. In addition, reference can be made to EP 0 785 041 A1, which corresponds to U.S. Pat. No. 5,829,761, which is incorporated herein by reference, and in which a drill chuck with a locking device has a two-part clamping sleeve having an outer metal shell and an inner plastic shell. Both the outer and the inner shells have a cylindrical basic shape. The outer metal shell increases the resistance of the drill chuck to external influences, while the inner shell made of plastic makes it possible, in particular, to economically provide control cams for the locking device.

Until now unknown in the prior art in keyless drill chucks is a metal clamping sleeve with a conical basic shape, specifically because a reliable process for applying knurling to the outer contour of the conical clamping sleeve, which is necessary for increasing the clamping force to be introduced, remains a problem.

SUMMARY OF THE INVENTION

It is therefore an object of the present invention to provide a drill chuck such that the conical basic shape can be provided through a metallic material while retaining an easy-to-modify inner circumferential surface without impairing the drilling properties of the drill chuck.

It is a further object of the invention to provide a method in which defect-free knurling can be applied to the outer circumference of a conical clamping sleeve made of metal using a reliable process.

In an embodiment, this object is attained in a drill chuck of the initially mentioned type in that the clamping sleeve is made in two parts, having a conical, metallic outer sleeve, having a conical, inner sleeve made of plastic, and in that the outer sleeve has a cylindrical subsection on its inner circumference for radial centering of the outer sleeve on the inner sleeve.

This design entails the advantage that through correct alignment of the outer sleeve relative to the inner sleeve, the true running characteristics are not impaired, which is to say that an imbalance resulting from incorrect alignment of the outer sleeve relative to the inner sleeve and to the chuck axis is avoided.

The cylindrical subsection can be provided in duplicate and can be implemented on the edge of the outer sleeve. In this embodiment, the correct alignment of the outer sleeve and the inner sleeve relative to one another is ensured by two cylindrical subsections that are formed on the front and rear edges in order to ensure correct alignment over the entire axial length.

For cost reasons and with regard to ease of production, it is beneficial for the cylindrical subsection to be composed of an annular collar that is beaded radially inward at the axially forward edge and that engages an annular groove formed on the inner sleeve.

It has also proven to be of value in practice for the clamping jaws to be guided in a longitudinally movable manner in guide seats formed at an angle to the chuck axis and to stand in engagement by means of external toothing with an internal thread of a threaded ring that can be rotated by the clamping sleeve.

Furthermore, it is beneficial if control cams are formed on the inner surface of the inner sleeve for moving the blocking element and/or the detent element of a locking device, the design of which shall not be discussed in detail, since reference can be made in this regard to EP 0 785 041 A1 of the same applicant.

In order to avoid damage when drilling through a workpiece, a protective cap that constitutes an axial stop for the outer sleeve is rotatably mounted on the inner sleeve or on the chuck body.

In order to be able to apply greater force for moving the clamping sleeve in a keyless drill chuck, and thus for opening and closing the drill chuck, knurling is formed on the circumferential surface of the conical outer sleeve.

The knurling can extend without axial interruption over the central region of the conical outer sleeve, spaced apart from the edges.

Furthermore, it is useful if the cone angle of the outer sleeve is between 3° and 30°, and in particular between 10° and 20°, wherein the cone angle can in particular be chosen in coordination with the configuration of the housing of the drill for which the drill chuck is designated. Thus, in this way the design of the drill chuck can be adapted to the design of the drill. Improved removal of chips and drilling dust also takes place as a result of the conical lateral surface, since chips and dust are not directed against a face edge of the drill housing.

In an embodiment a method for producing the knurling on the outer circumferential surface of a conical, metallic clamping sleeve for a drill chuck is provided, wherein, during application of the knurling, the knurling tool is moved relative to the outer circumferential surface along a trajectory that is not parallel to a line on the outer circumferential surface defined by the cone angle.

According to expert opinion, for geometric, topological reasons it was impossible to reliably form "consistent" knurling on a conical clamping sleeve, since a non-uniform knurling pattern is produced due to the widening in the outer diameter of the outer sleeve, and this pattern is unacceptable for design reasons and would be rejected by customers. Using the method according to the invention, it is now possible for the first time to produce knurling on a conical, metallic clamping sleeve having a visual appearance with no knurling defects.

It has proven useful in this context for the difference between the cone angle and the trajectory to be between 1° and 10°, in particular between 2° and 5°.

In an embodiment an outer sleeve is provided having a metallic base body with a conical basic shape, having knurling formed on the outer circumferential surface, wherein the cut depth of the ridges constituting the knurling decreases from one edge of the knurling to the other edge of the knurling.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
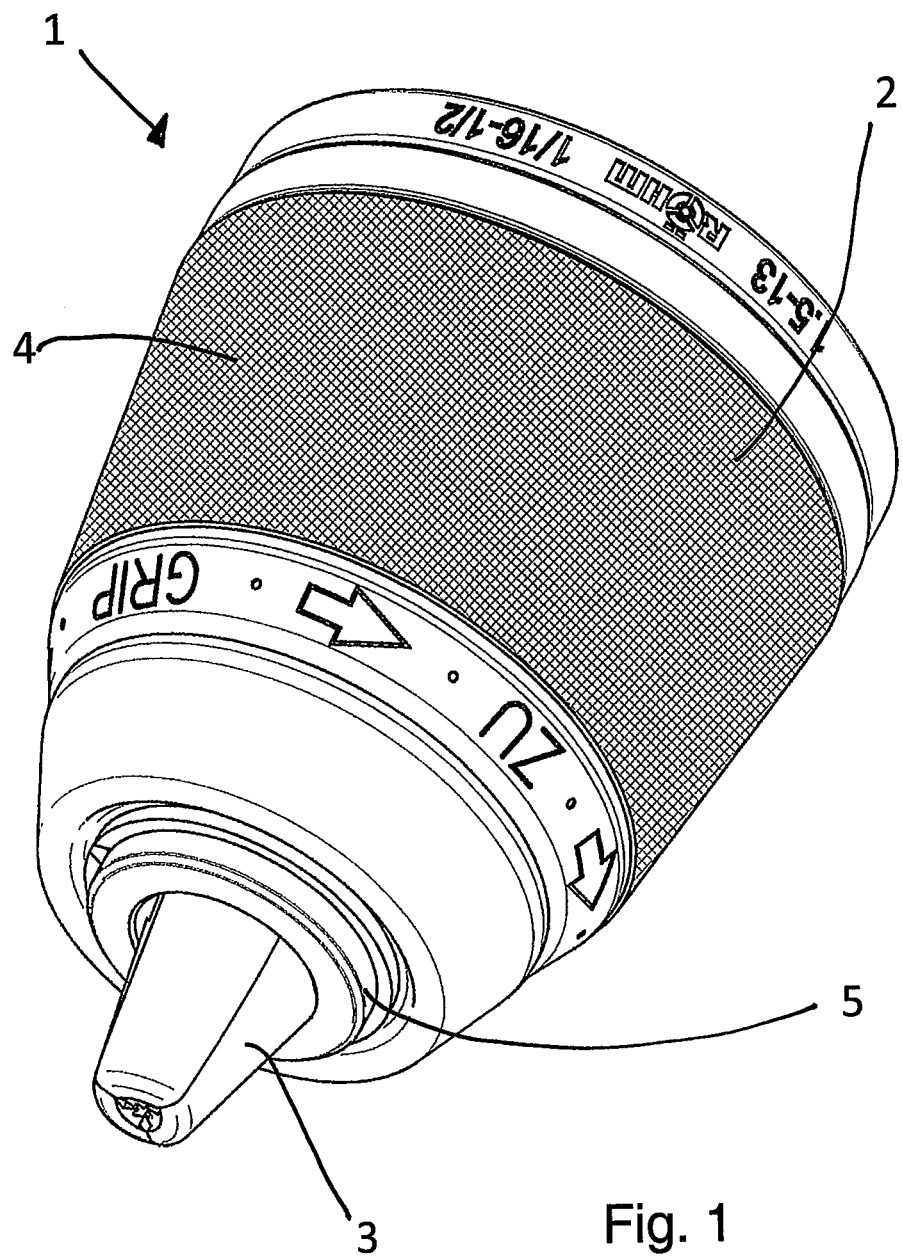
FIG. 1 is a perspective view of an embodiment of the invention.

All embodiments of the invention depicted in the drawings have in common that they show a drill chuck 1 with a chuck body 5 and with a clamping sleeve 2 that can rotate about the chuck axis 6 of the chuck body, wherein the clamping sleeve 2 has a conical basic shape. In the exemplary embodiments shown in the drawings, rotating the clamping sleeve 2 moves the clamping jaws 3 relative to the chuck body 5, wherein the clamping jaws 3 are guided in a longitudinally movable manner in guide seats formed at an angle to the chuck axis 6, and stand in engagement by means of external toothing with an internal thread of a threaded ring 7 that can be rotated by the clamping sleeve 2. The drill chucks 1 shown in the drawing also have a locking device, the basic design of which corresponds to the locking device 8 of the drill chuck from EP 0 785 041 A1, which disclosure can be referenced for an explanation of the locking device 8. This locking device 8 includes, in particular, a blocking element that interoperates with toothing 16 of the chuck body 5; the blocking element is arranged in an intermediate sleeve 9 that is connected to the threaded ring 7 in a rotationally fixed manner, and is moved by control cams formed on the inner surface of the clamping sleeve 2. A detent element that serves to secure the blocking element in the applicable switching state is likewise operated through control cams on the inner surface of the clamping sleeve 2.

It is essential to the concept of the invention that the clamping sleeve 2 has a conical basic shape. In addition, the clamping sleeve 2 is made in two parts, with a conical, metallic outer sleeve 10, and with a conical, inner sleeve 11 made of plastic. The outer sleeve 10 has at least one cylindrical subsection 12 on its inner circumference for radial centering of the outer sleeve 10 on the inner sleeve 11; in all the exemplary embodiments shown in the drawings, the cylindrical subsection is provided in duplicate, namely one subsection on the axially forward edge and one on the axially rear edge. The subsection 12 on the axially forward edge is composed of an annular collar 13 that is beaded inward and that engages an annular groove 14 formed on the inner sleeve 11.

Figure 2:
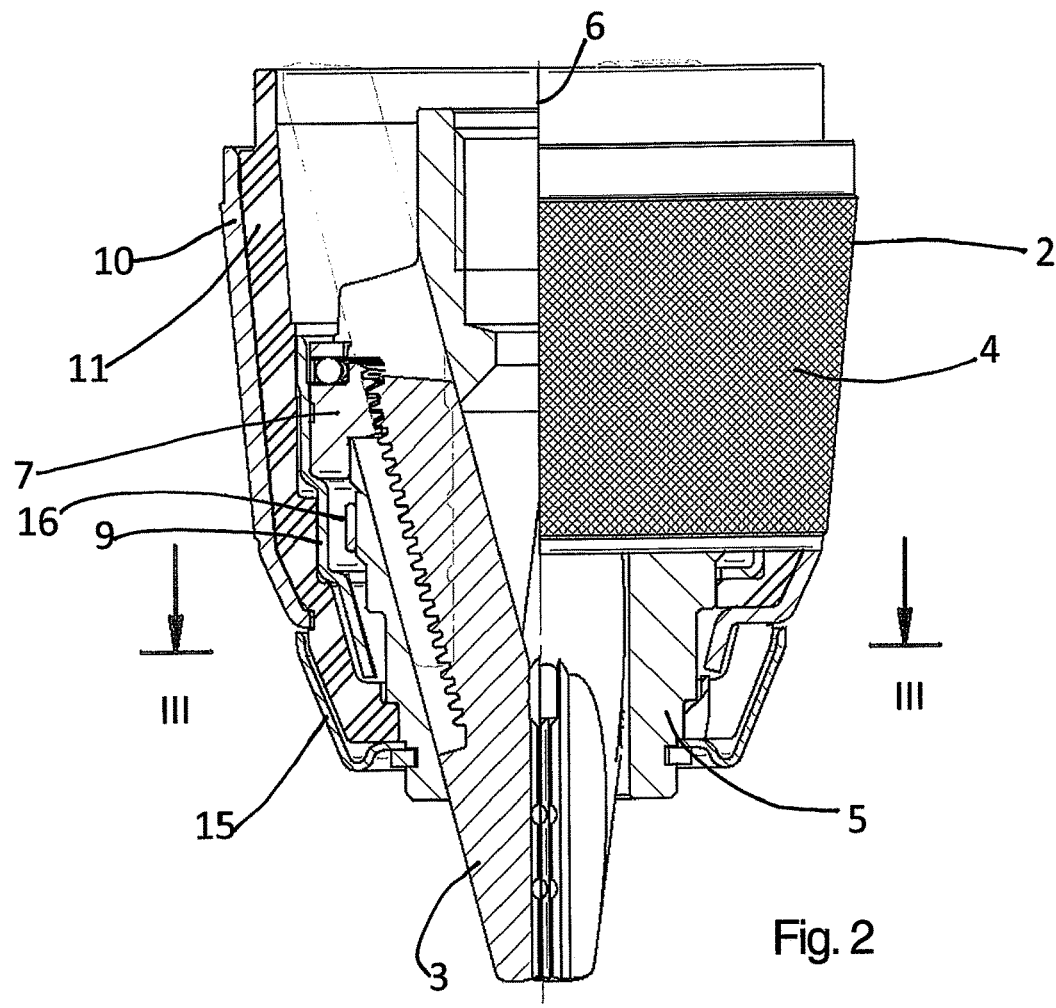
FIG. 2 is a side view of the drill chuck from FIG. 1, with the left-hand half shown in cross-section.
Figure 3:
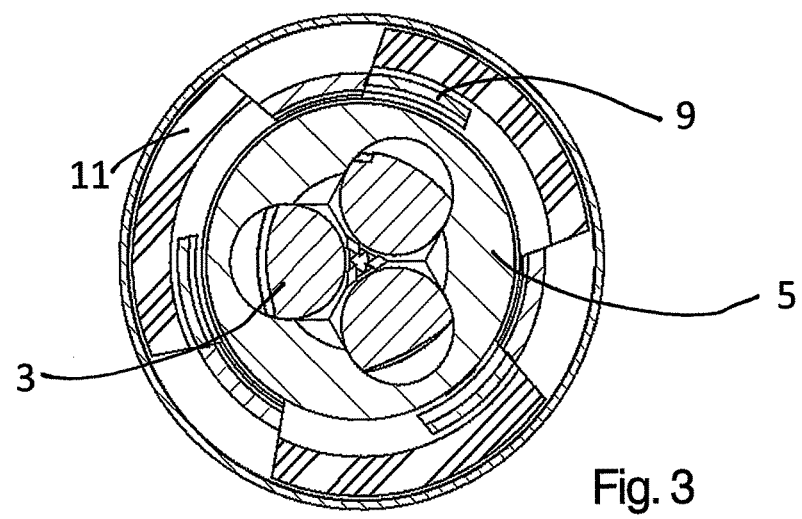
FIG. 3 is the section III-III from FIG. 2.
Figure 4:
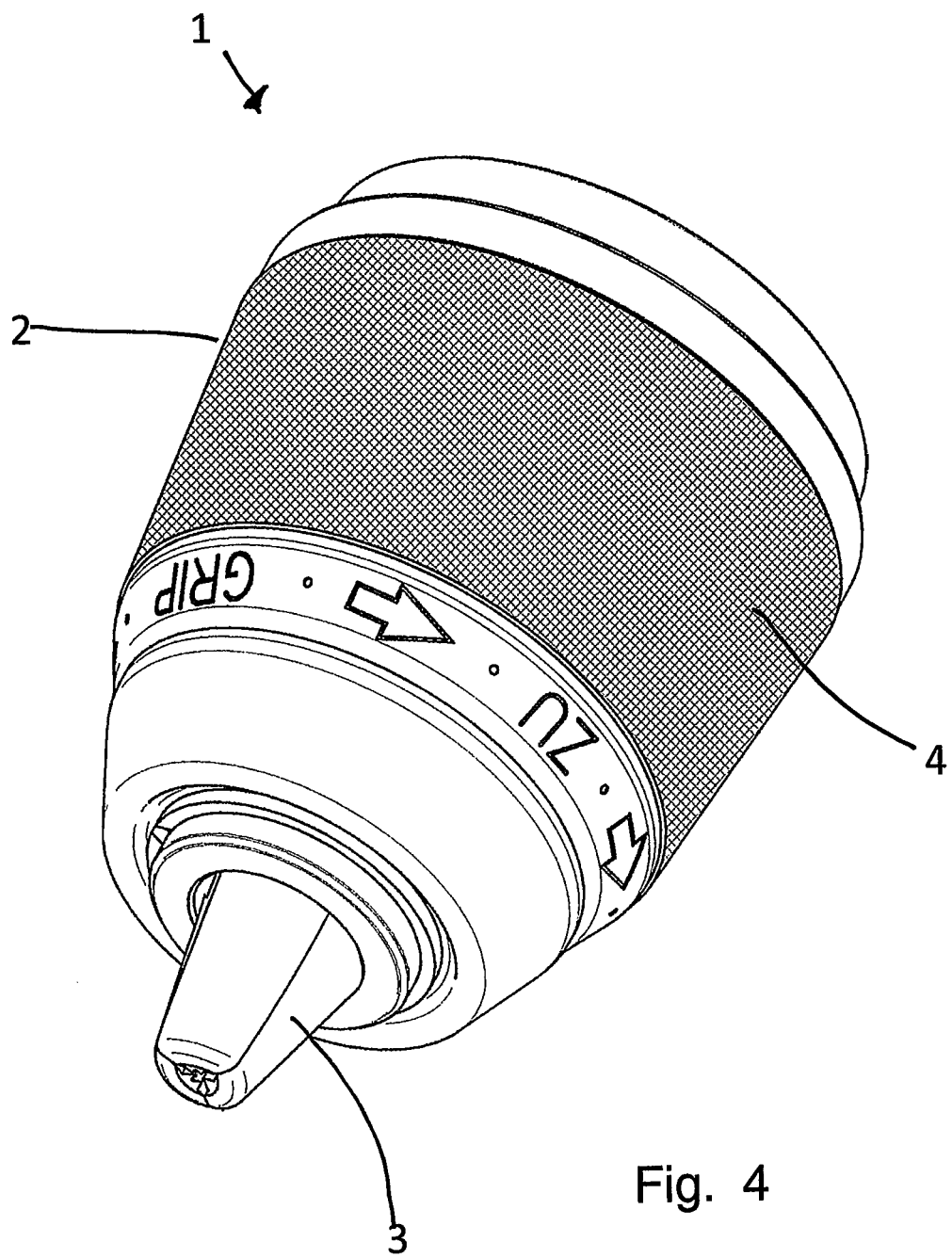
FIG. 4 is a view corresponding to FIG. 1 of an embodiment of the invention.
Figure 5:
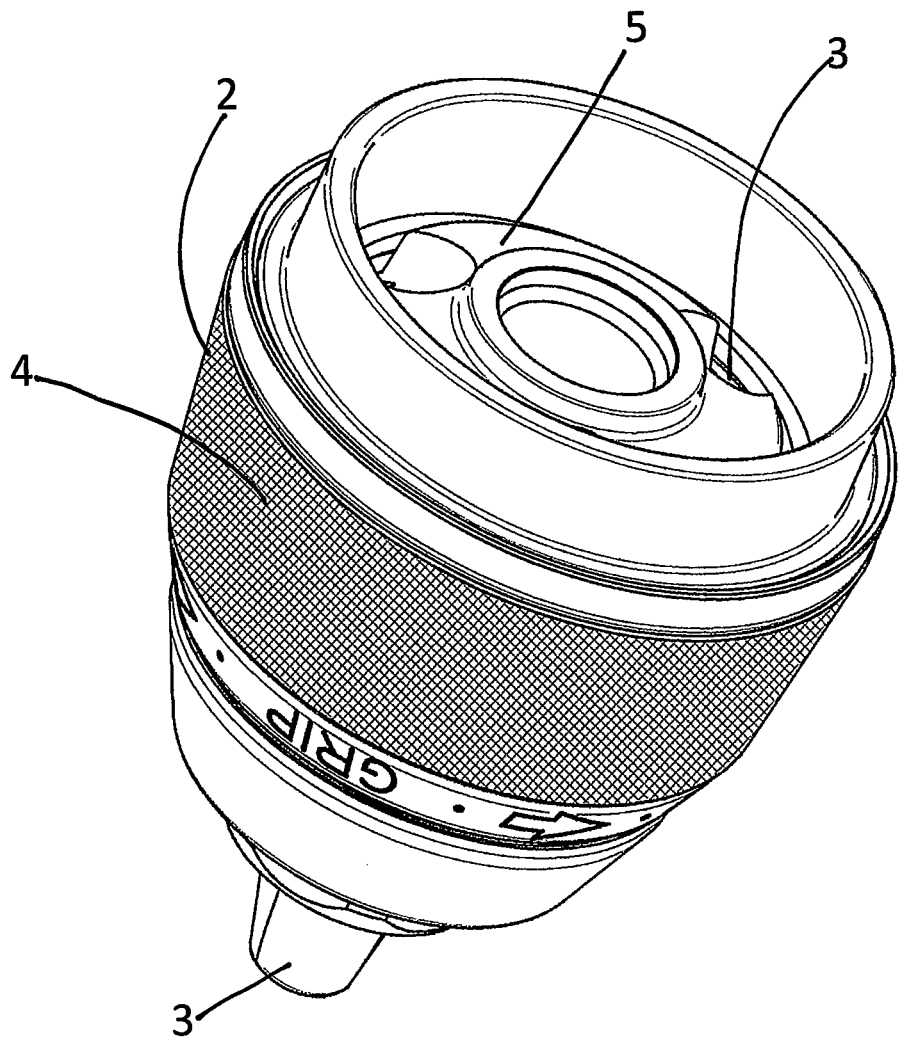
FIG. 5 is a view of the drill chuck from FIG. 1 from a different perspective.
Figure 6:
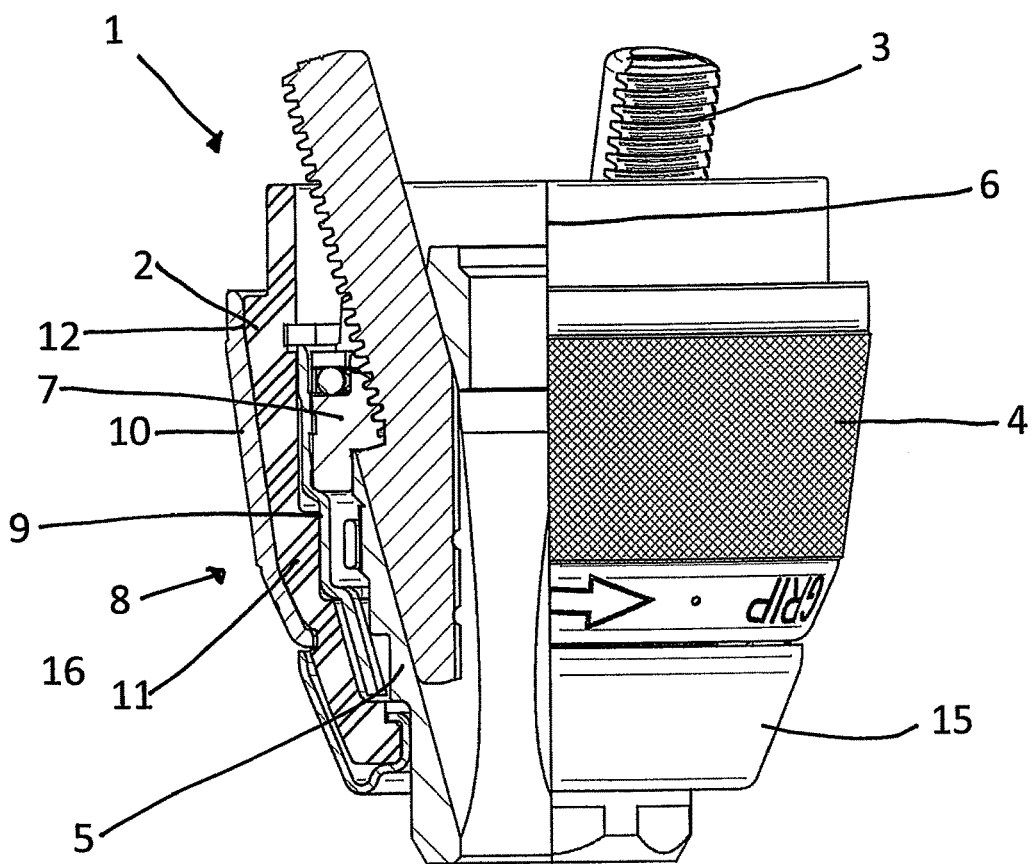
FIG. 6 is a view corresponding to FIG. 2 of the drill chuck from FIG. 4.
Figure 7:
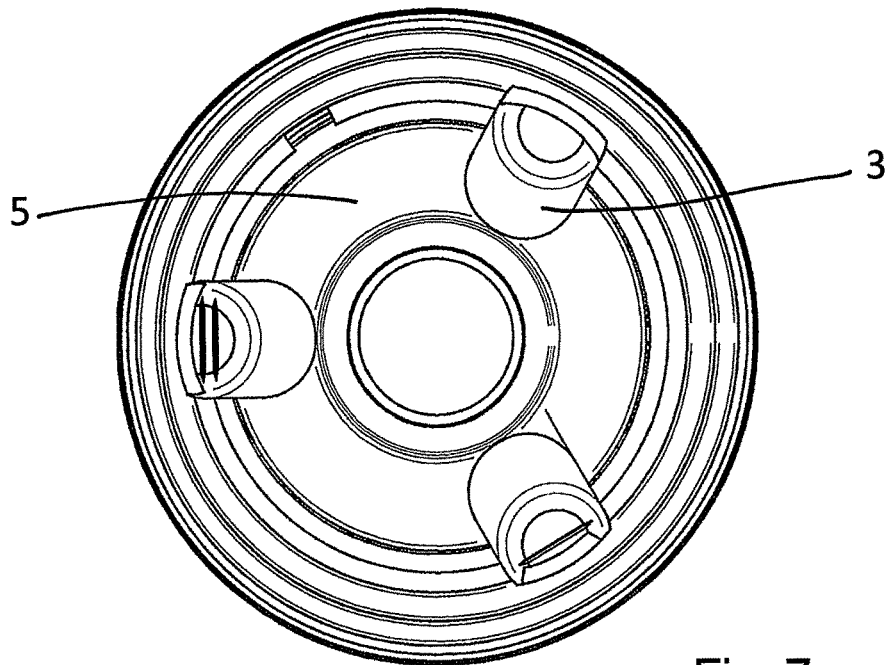
FIG. 7 is a view from the rear of the drill chuck from FIG. 4.
Figure 8:
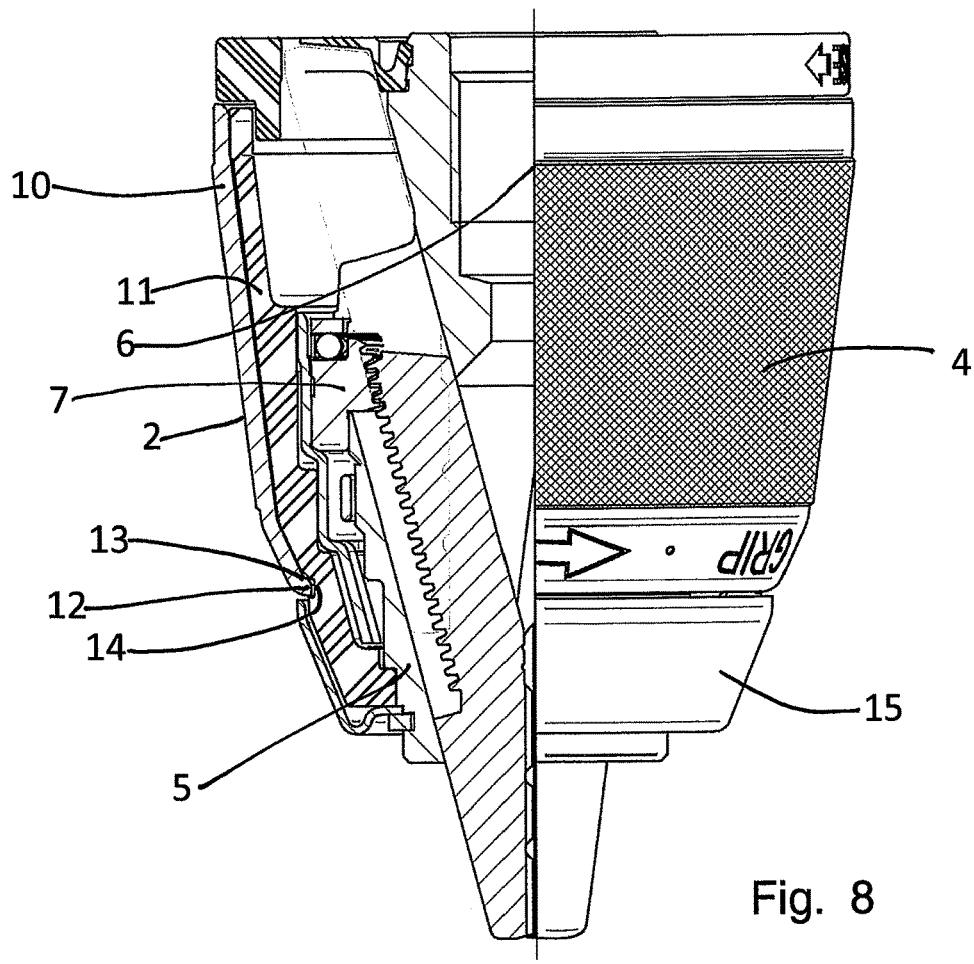
FIG. 8 is an embodiment of a drill chuck according to the invention in a view corresponding to FIG. 2.
Figure 9:
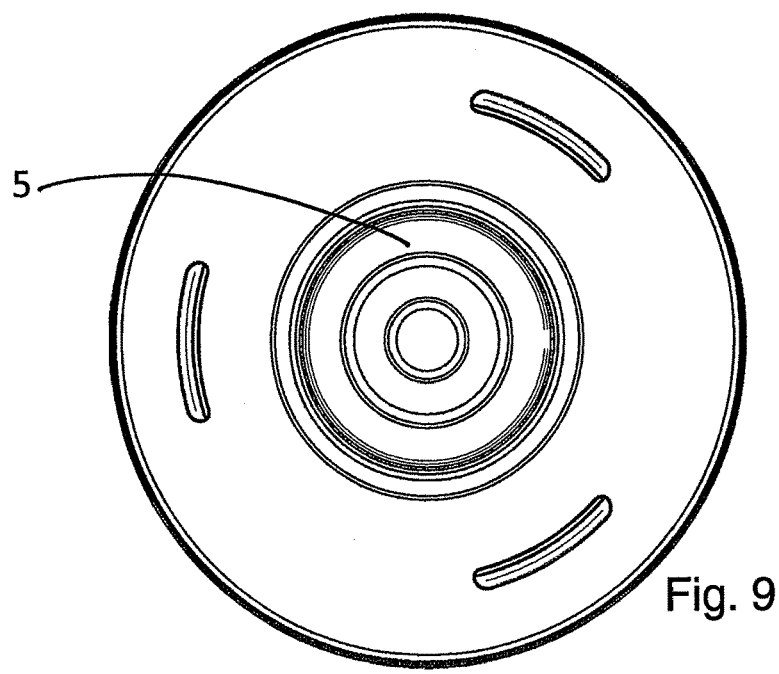
FIG. 9 is a view from the rear of the drill chuck from FIG. 8.

Rotatably mounted on the chuck body 5 (FIG. 2) or on the inner sleeve 11 (FIG. 6) is a protective cap 15 that constitutes an axial stop for the outer sleeve 10, so this protective cap 15 is additionally used to secure the position of the outer sleeve 10.

Formed on the circumferential surface of the conical outer sleeve 10 is knurling 4 that extends from the edges over the central region without axial interruption, and namely with no errors in the knurling pattern.

The cone angle of the outer sleeve 10 is between 3° and 30°.

In order to be able to produce the knurling 4 on the outer sleeve 10 with a correct knurling pattern, a method is used in which the knurling tool is moved relative to the outer circumferential surface along a trajectory that is not parallel to a line on the outer circumferential surface defined by the cone angle during application of the knurling 4. During this process, the difference between the cone angle and the trajectory is between 1° and 10°, in particular between 2° and 5°.

Using this method, the result is then an outer sleeve 10 having a metallic base body with a conical basic shape, in which the knurling 4 formed on the outer circumferential surface is composed of ridges whose cut depth decreases from one edge of the knurling 4 to the other edge of the knurling.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drill chuck comprising:
   a chuck body;
   a clamping sleeve with a conical shape that is rotatable about a chuck axis of the chuck body, via rotation of the clamping sleeve a plurality of clamping jaws are movable relative to the clamping body,
   wherein the clamping sleeve is made in two parts, having a metallic outer sleeve and having an inner sleeve made of plastic, the metallic outer sleeve and the inner sleeve each having a conical basic shape,
   wherein the outer sleeve has a cylindrical subsection on its inner circumference for radial centering of the outer sleeve on the inner sleeve,
   wherein a knurling is formed on a circumferential surface of the conical basic shape of the outer sleeve,
   wherein the knurling is uniform along an entirety of the circumferential surface of the conical basic shape of the outer sleeve, and
   wherein the knurling is defect-free.

2. The drill chuck according to claim 1, wherein the cylindrical subsection is provided in duplicate and is implemented on an edge of the outer sleeve.

3. The drill chuck according to claim 1, wherein the cylindrical subsection is composed of an annular collar that is beaded radially inward at an axially forward edge and that engages an annular groove formed on the inner sleeve.

4. The drill chuck according to claim 1, wherein the clamping jaws are guided in a longitudinally movable manner in guide seats formed at an angle to the chuck axis and stand in engagement via external toothing with an internal thread of a threaded ring that is rotated by the clamping sleeve.

5. The drill chuck according to claim 4, wherein control cams are formed on the inner surface of the inner sleeve for moving a blocking element or a detent element of a locking device.

6. The drill chuck according to claim 1, wherein a protective cap that forms an axial stop for the outer sleeve is rotatably mounted on the inner sleeve or on the chuck body.

7. The drill chuck according to claim 1, wherein the knurling extends without axial interruption over a central region of the outer sleeve, spaced apart from edges of the outer sleeve.

8. The drill chuck according to claim 1, wherein a cone angle of the outer sleeve is between 3° and 30°, or between 10° and 20°.

9. The drill chuck according to claim 1, wherein an entirety of an outer circumference of the outer sleeve is conical.

10. The drill chuck according to claim 1, wherein the cylindrical subsection is the only portion of the outer sleeve having a cylindrical shape.

11. The drill chuck according to claim 1, wherein an entire outer contour of the clamping sleeve is conical.

12. The drill chuck according to claim 1, wherein the knurling comprises ridges whose depth decreases from a first edge of the knurling to a second edge of the knurling.

13. The drill chuck according to claim 1, wherein the knurling is formed by moving, during application of the knurling, a knurling tool relative to the outer circumferential surface along a trajectory that is not parallel to a line on an outer circumferential surface defined by a cone angle.

14. A drill chuck comprising:
a chuck body having a chuck axis;
a conical clamping sleeve rotatable about the chuck axis of the chuck body;
a plurality of clamping jaws movable relative to the clamping body via rotation of the clamping sleeve, the clamping sleeve comprising:
 a plastic conical inner sleeve; and
 a metallic outer sleeve having an outer contour having a conical portion, the outer sleeve having a cylindrical subsection on its inner circumference for radial centering of the outer sleeve on the inner sleeve; and
a knurling formed on the conical portion of the metallic outer sleeve,
wherein the knurling is uniform along an entirety of the circumferential surface of the conical basic shape of the outer sleeve, and
wherein the knurling is defect-free.

15. A drill chuck comprising:
a chuck body;
a clamping sleeve with a conical shape that is rotatable about a chuck axis of the chuck body, via rotation of the clamping sleeve a plurality of clamping jaws are movable relative to the clamping body, the clamping sleeve being made in two parts, comprising:
 a conical metallic outer sleeve; and
 a conical inner sleeve made of plastic,
wherein a knurling is formed on a circumferential surface of the conical basic shape of the outer sleeve, the knurling being formed by moving, during application of the during, a knurling tool relative to the outer circumferential surface along a trajectory that is not parallel to a line on an outer circumferential surface defined by a cone angle,
wherein the knurling is uniform along an entirety of the circumferential surface of the conical basic shape of the outer sleeve, and
wherein the knurling is defect-free.

* * * * *